United States Patent
Shojaku (10) Patent No.: US 9,986,105 B2
(45) Date of Patent: May 29, 2018

(54) COLOR REPRODUCTION ANALYZING APPARATUS, IMAGE FORMING APPARATUS, COLOR REPRODUCTION ANALYZING METHOD, AND NON-TRANSITORY COMPUTER READABLE STORAGE MEDIUM STORED WITH PROGRAM FOR COLOR REPRODUCTION ANALYZING APPARATUS

(71) Applicant: Konica Minolta, Inc., Chiyoda-ku, Tokyo (JP)

(72) Inventor: Hiroki Shojaku, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/214,601

(22) Filed: Jul. 20, 2016

(65) Prior Publication Data
US 2017/0026526 A1    Jan. 26, 2017

(30) Foreign Application Priority Data
Jul. 23, 2015  (JP) .................. 2015-146008

(51) Int. Cl.
*H04N 1/00* (2006.01)
*H04N 1/60* (2006.01)

(52) U.S. Cl.
CPC ..... *H04N 1/00039* (2013.01); *H04N 1/00023* (2013.01); *H04N 1/60* (2013.01)

(58) Field of Classification Search
None
See application file for complete search history.

(56) References Cited

U.S. PATENT DOCUMENTS

2006/0062441 A1  3/2006 Nishida
2008/0205751 A1*  8/2008 Mischler .............. H04N 1/38
                                                                    382/163

(Continued)

FOREIGN PATENT DOCUMENTS

JP  2006-94040 A  4/2006
JP  2007-59971 A  3/2007

(Continued)

OTHER PUBLICATIONS

Japanese Office Action ("Notification of Reasons for Refusal") dated Aug. 21, 2017, by the Japanese Patent Office in corresponding Japanese Patent Application No. 2015-146008 (9 pages).

*Primary Examiner* — Helen Zong
(74) *Attorney, Agent, or Firm* — Buchanan Ingersoll & Rooney PC (57) ABSTRACT

A color reproduction analyzing apparatus includes: a specific area extractor that extracts a specific area on which an error is supposed to occur as an error factor area when image data for image forming for forming an image on paper and read image data generated by reading the image on the paper are received and compared; and a color reproduction analyzer that obtains pixel values of a desired color in a position corresponding to the image data for image forming and the read image data, excludes the error factor area, and compares pixel values of the image data for image forming and the read image data to analyze a color reproduction.

20 Claims, 6 Drawing Sheets

(56) References Cited

U.S. PATENT DOCUMENTS

| | | | |
|---|---|---|---|
| 2010/0080286 A1* | 4/2010 | Hong | H04N 19/61 375/240.02 |
| 2012/0133962 A1* | 5/2012 | Kondo | H04N 1/6033 358/1.9 |
| 2012/0147437 A1* | 6/2012 | Nagai | H04N 1/40093 358/448 |
| 2013/0336666 A1* | 12/2013 | Amit | G03G 15/01 399/15 |
| 2015/0049354 A1* | 2/2015 | Kawano | H04N 1/00336 358/1.13 |
| 2015/0130829 A1 | 5/2015 | Aizaki et al. | |
| 2015/0379384 A1* | 12/2015 | Yamashita | G03G 15/50 358/1.2 |
| 2016/0052318 A1* | 2/2016 | Humet Pous | H04N 1/6036 347/19 |

FOREIGN PATENT DOCUMENTS

| | | | |
|---|---|---|---|
| JP | 2007059971 | * | 3/2007 |
| JP | 2009-083427 A | | 4/2009 |
| JP | 2015-111801 A | | 6/2015 |

* cited by examiner

COLOR REPRODUCTION ANALYZING APPARATUS, IMAGE FORMING APPARATUS, COLOR REPRODUCTION ANALYZING METHOD, AND NON-TRANSITORY COMPUTER READABLE STORAGE MEDIUM STORED WITH PROGRAM FOR COLOR REPRODUCTION ANALYZING APPARATUS

CROSS-REFERENCE TO RELATED APPLICATION

This application claims a priority under the Paris Convention of Japanese patent application No. 2015-146008 filed on Jul. 23, 2015, the entirety of which is incorporated herein by references.

BACKGROUND

1. Technical Field

The present invention relates to a color reproduction analyzing apparatus, an image forming apparatus, a color reproduction analyzing method, and a non-transitory computer readable storage medium stored with a program for a color reproduction analyzing apparatus, and in particular, relates to a technology for accurately controlling color variations without patches.

2. Description of Related Art

There has been an image forming apparatus in which a reading unit including an inline sensor and the like is connected to a downstream side of an image forming unit for forming an image on paper, and the image formed on the paper is read. In addition, there has been an image forming system in which a reading apparatus (output object reading apparatus) is connected to a subsequent stage of an image forming apparatus for forming an image on paper and the image formed on the paper is read by the reading apparatus.

In such an image forming apparatus and an image forming system, a predetermined patch image is formed periodically on paper and the patch image on the paper is read so that it is possible to detect color variations of the image forming apparatus to make a correction (calibration).

However, since the patch image is formed on the paper, there have been problems of consumption of paper for forming the patch image and decrease in productivity in normal image forming due to output of the paper on which the patch image is formed.

In order to prevent such waste of paper and decrease in productivity, a method in which image data for image forming is compared with output object reading image data read from an image memory on a pixel-by-pixel basis in normal image forming has been proposed. According to this method, since the patch image is not formed on paper, reduction of waste of paper and prevention of decrease in productivity are expected.

As such a technique, various related proposals are made in Unexamined Japanese Patent Publication No. 2009-83427.

SUMMARY

In the above mentioned patent document, positional difference between the image data for image forming and the read image data is not considered in comparison of the image data for image forming and the read image data.

Therefore, it became clear that many errors occur at a position where a pixel value sharply varies in particular since positions of the corresponding pixels are different when comparing the image data in which positional difference occurs. As a result, it also became clear that errors occur in data which is necessary for calibration so that the errors lead to reduction in accuracy of adjustment.

To correct the positional difference to completely make a match is technically difficult. The positional difference is a main error factor in color reproduction analysis. However, a conventional art does not consider the positional difference so that detection (color reproduction analysis) with high accuracy has been difficult.

An object of the present invention is to provide a color reproduction analyzing apparatus, an image forming apparatus, a color reproduction analyzing method, and a non-transitory computer readable storage medium stored with a program for the color reproduction analyzing apparatus that can analyze color reproduction without the color patch or the like and without being influenced by an unstable factor.

To achieve at least one of the abovementioned objects, the color reproduction analyzing apparatus, the image forming apparatus, the color reproduction analyzing method, and the non-transitory computer readable storage medium stored with the program for the color reproduction analyzing apparatus reflecting one aspect of the present invention comprises the followings.

(1) A color reproduction analyzing apparatus comprising: a specific area extractor that extracts a specific area on which an error is supposed to occur as an error factor area when image data for image forming for forming an image on paper and read image data generated by reading the image on the paper are received and compared; and a color reproduction analyzer that obtains pixel values of a desired color in a position corresponding to said image data for image forming and said read image data, excludes said error factor area, and compares the pixel values of said image data for image forming and said read image data to analyze a color reproduction.

(2) The color reproduction analyzing apparatus as claimed in above (1), wherein said specific area extractor unit extracts an area with higher spatial frequency than other areas as said error factor area in at least one of said image data for image forming and said read image data.

(3) The color reproduction analyzing apparatus as claimed in above (1), wherein said specific area extractor extracts an area including an edge as said error factor area in at least one of said image data for image forming and said read image data.

(4) The color reproduction analyzing apparatus as claimed in above (1), wherein said specific area extractor makes an adjustment so that the area to be extracted as said error factor area is increased or decreased in accordance with an instruction or an adjustment.

(5) The color reproduction analyzing apparatus as claimed in above (1), wherein said color reproduction analyzer determines a primary color in a color used by said image forming unit as said desired color when obtaining said pixel value.

(6) The color reproduction analyzing apparatus as claimed in above (1), wherein said color reproduction analyzer searches for a pixel of a primary color in a color used by said image forming unit at a position corresponding to said image data for image forming and said read image data and obtains a combination of a pixel value of a color of a complementary color of said primary color and a pixel value of said primary color in said pixel that is searched for.

(7) The color reproduction analyzing apparatus as claimed in above (6), wherein said color reproduction analyzer considers as said primary color even if other colors than said primary color are included in an amount less than a constant amount.

(8) The color reproduction analyzing apparatus as claimed in above (1), wherein said color reproduction analyzer determines a multi-color of at least secondary color or more in a color used by an image forming unit as said desired color when obtaining said pixel value.

(9) The color reproduction analyzing apparatus as claimed in above (8), wherein said color reproduction analyzer considers as said multi-color even if other colors than said multi-color are included in an amount less than a constant amount.

The objects, features, and characteristics of this invention other than those set forth above will become apparent from the description given herein below with reference to preferred embodiments illustrated in the accompanying drawings.

DETAILED DESCRIPTION

Hereinafter, an embodiment of the color reproduction analyzing apparatus, the image forming apparatus, the color reproduction analyzing method, and the non-transitory computer readable storage medium stored with the program for the color reproduction analyzing apparatus that can analyze color reproduction without the color patch or the like and without being influenced by the unstable factor will be described in detail with reference to the drawings.

[Configuration of Image Forming Apparatus]

Figure 1:
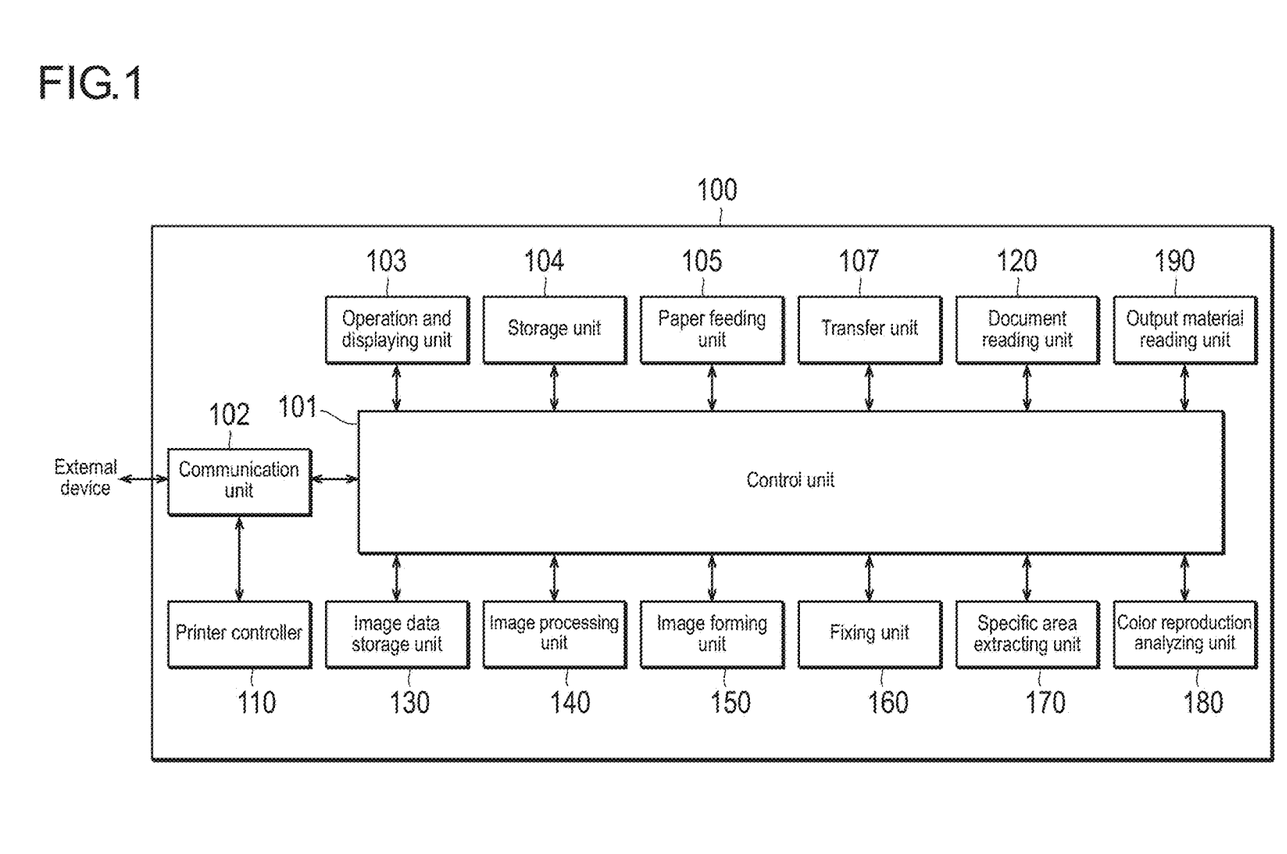
FIG. 1 is a configuration diagram illustrating a configuration according to an embodiment of the present invention.
Figure 2:
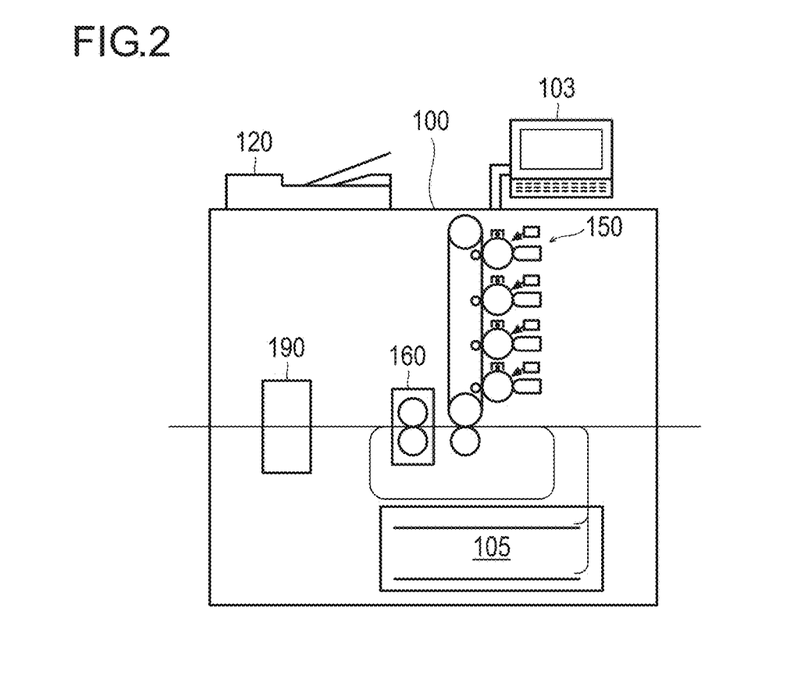
FIG. 2 is a configuration diagram illustrating a configuration according to an embodiment of the present invention.

A first configuration example of the image forming apparatus will be described in detail with reference to FIGS. 1 and 2. With reference to FIGS. 1 and 2, an image forming apparatus 100 that can read paper (output material) on which an image is formed will be described.

The image forming apparatus 100 includes a control unit 101 (CPU) for controlling each unit in the image forming apparatus 100, a communication unit 102 for communicating with connected other apparatuses, an operation and displaying unit 103 for receiving operation inputs by a user and displaying a state of the image forming apparatus 100, a storage unit 104 for storing various settings, a paper feeding unit 105 for feeding paper stored in a paper feed tray, a transfer unit 107 for transferring the paper in the apparatus, a printer controller 110 for processing original image data described in PDL received from an external device by RIP process to make image data for image forming, a document reading unit 120 for reading a document, an image data storage unit 130 for storing the image data and various data when forming an image, an image processing unit 140 for performing various image processing necessary for image forming, an image forming unit 150 for forming the image on paper based on an instruction to form the image and the image data, a fixing unit 160 for fixing the image by toner formed on paper by heat and pressure, a specific area extracting unit 170 for extracting a specific area as an error factor area, a color reproduction analyzing unit 180 for comparing pixel values in the image data for image forming and read image data to analyze color reproduction, and an output material reading unit 190 for reading the image formed on paper.

As illustrated in FIG. 2, the image forming unit 150 is a so-called electrophotographic image forming unit in which an electrostatic latent image formed in charged image carriers is developed to be a toner image and the toner images of each color are superimposed on an intermediate transfer body to be transferred to the paper. However, a specific configuration of the image forming unit 150 is not limited to what is illustrated in FIG. 2.

The output material reading unit 190 reads the image formed on the paper. The output material reading unit 190 is provided at a downstream side of the image forming unit 150 and the fixing unit 160, and reads the image while the paper is being transferred. The output material reading unit 190 may be provided in an intermediate processing apparatus or a post processing apparatus that is a subsequent stage of the image forming apparatus 100.

The output material reading unit 190 may include an output material reading unit for the first side for reading the image on one side of the paper and an output material reading unit for the second side for reading the image on the other side of the paper.

Such an image forming apparatus 100 refers to a result of reading after image forming to adjust image forming position and image quality (such as color, strength, and line width), and the result of reading by the output material reading unit 190 is supplied to the control unit 101. It is also possible to read the paper on which the image is formed by the document reading unit 120 to adjust the image forming position and the image quality (such as color, strength, and line width).

[Configuration of the Color Reproduction Analyzing Apparatus]

The image forming apparatus 100 described above includes the color reproduction analyzing apparatus. The color reproduction analyzing apparatus including the specific area extracting unit 170 and the color reproduction analyzing unit 180 may be provided outside the image forming apparatus 100.

[Operation of the Color Reproduction Analyzing Apparatus and the Image Forming Apparatus (1)]

[Basic Operation]

Hereinafter, an operation of the color reproduction analyzing apparatus and the image forming apparatus according to the present embodiment will be described as an operation of the image forming apparatus 100.

Figure 3:
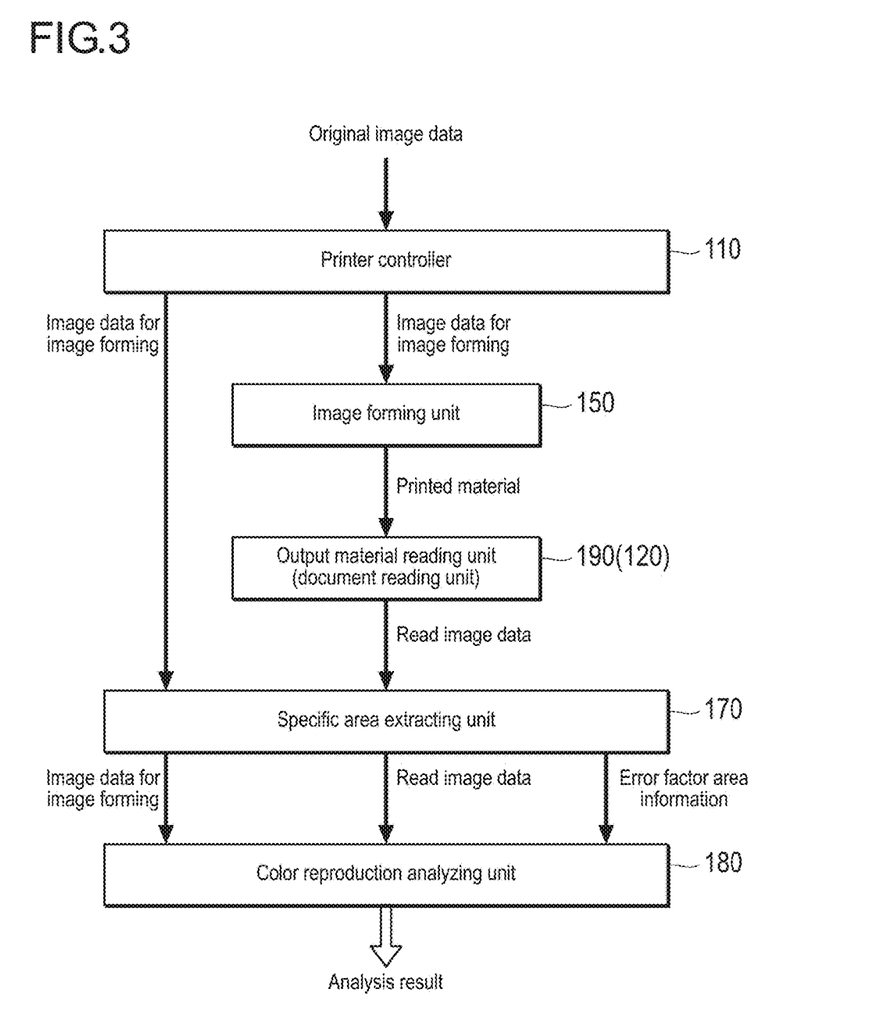
FIG. 3 is an explanatory diagram illustrating a process block according to an embodiment of the present invention.

FIG. 3 is a process block diagram illustrating flow of data when color reproduction analysis according to the present embodiment is performed. Although control by the control unit 101 in various processing is omitted in FIG. 3, the control unit 101 performs various controls in transmission of information between units and in performing processing.

The printer controller 110 performs RIP processing on original image data before RIP described in page-description language to generate the image data (the image data for forming image) for image forming by the image forming unit 150. The printer controller 110 stores the image data for image forming in the image data storage unit 130 and supplies the image data for image forming to the image forming unit 150, the specific area extracting unit 170, and the color reproduction analyzing unit 180 as necessary.

The image forming unit 150 performs image forming with the image data for image forming supplied from the printer controller 110 to form the image on the paper and output a printed material.

The printed material is read by the output material reading unit 190 or the document reading unit 120 and the read image data is generated. The output material reading unit 190 or the document reading unit 120 stores the read image data generated by reading the printed material in the image data storage unit 130 and as necessary supplies the read image data to the specific area extracting unit 170 and the color reproduction analyzing unit 180.

The specific area extracting unit 170 determines the specific area where an error is supposed to occur when the image data for image forming is compared with the read image data as an error factor area so that the specific area is excluded from the comparison. That is, the specific area extracting unit 170 determines the specific area where the error is supposed to easily occur due to characteristics of a content and the image, for example, an edge and its vicinity area, and an area with higher spatial frequency than other areas and its vicinity area, as the error factor area, and determines the error factor area as an area to be excluded when comparing pixel values.

The specific area extracting unit 170 extracts an area with higher spatial frequency than other areas as the error factor area in at least one of the image data for image forming and the read image data. The specific area extracting unit 170 extracts an area including an edge and an area including a fine pattern as the error factor area in at least one of the image data for image forming and the read image data. The specific area extracting unit 170 stores error factor area information indicating a pixel position of the error factor area in the image data storage unit 130 and as necessary supplies the error factor area information to the color reproduction analyzing unit 180.

The color reproduction analyzing unit 180 obtains a pixel value of a desired color at a corresponding position of the image data for image forming and the read image data, excludes the error factor area, and compares pixel values at the same position in the image data for image forming and the read image data to analyze the color reproduction.

The control unit 101 generates an adjustment parameter to make an adjustment so that the image forming unit 150 can form the image with a target color from a result of an analysis of color reproduction by the color reproduction analyzing unit 180 as necessary, stores the adjustment parameter in the image data storage unit 130, and supplies the adjustment parameter to the image forming unit 150 as necessary.

[Detailed Operation]

Hereinafter, an operation of the color reproduction analyzing apparatus and the image forming apparatus according to the present embodiment will be described in detail with reference to flow charts of FIGS. 4 and 5.

Figure 4:
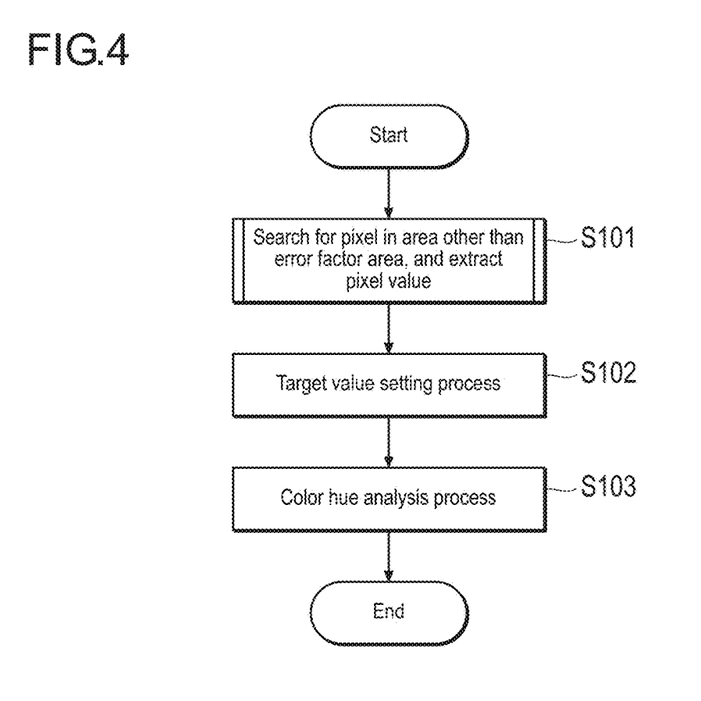
FIG. 4 is a flow chart illustrating an operation according to an embodiment of the present invention.
Figure 5:
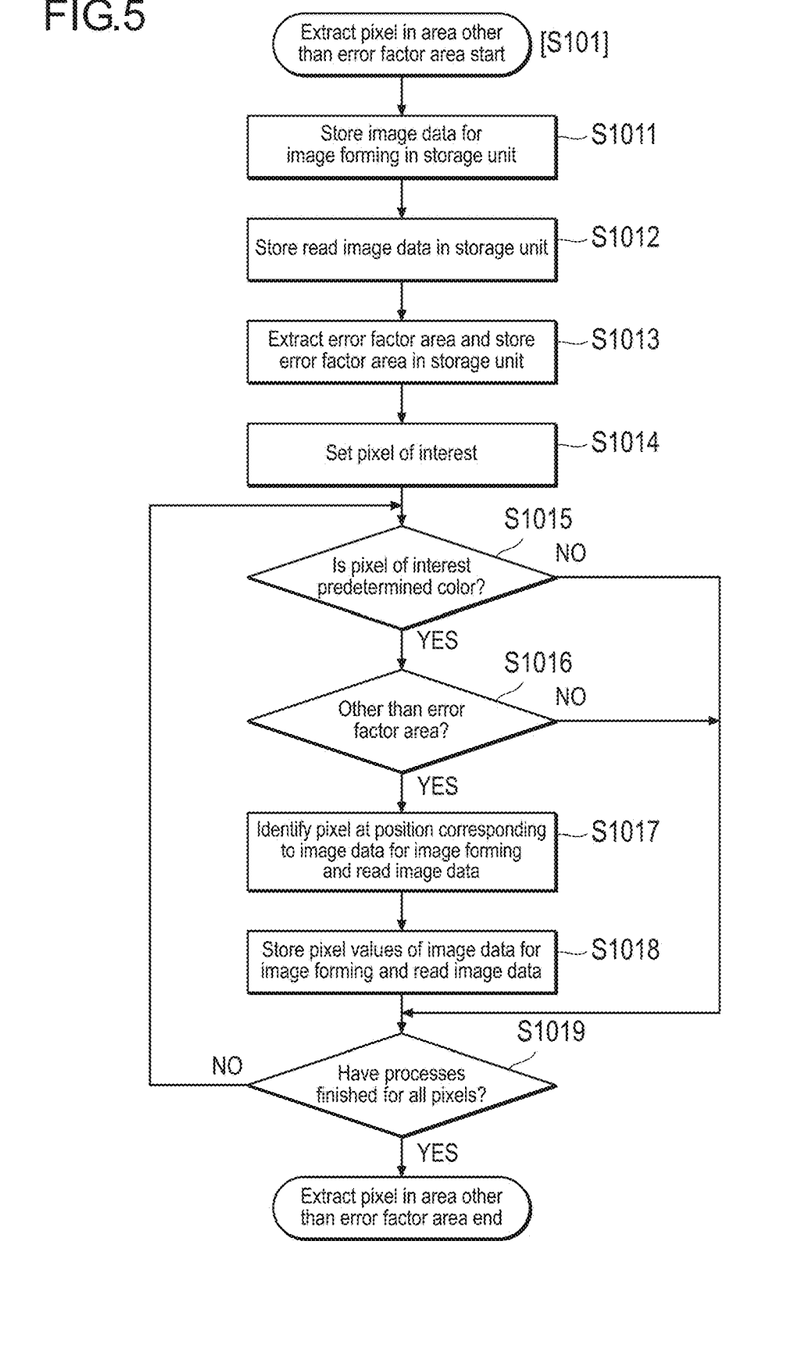
FIG. 5 is a flow chart illustrating an operation according to an embodiment of the present invention.

FIG. 4 is the flow chart illustrating an operation of a characterizing part of the present embodiment, and FIG. 5 is a flow chart illustrating a part of processing of FIG. 4 in more detail.

First, a pixel in an area other than the error factor area is extracted (Step S101 in FIG. 4). Hereinafter, extraction of the pixel in the area other than the error factor area (Step S101 in FIG. 4) will be described with reference to the flow chart of FIG. 5.

The printer controller 110 performs RIP processing on designated original image data to generate the image data for image forming by operating the operation and displaying unit 103 or an external computer. The image data for image forming is used for image forming by the image forming unit 150 and stored in the image data storage unit 130 for subsequent processing (Step S1011 in FIG. 5).

The printed material on which the image is formed by the image forming unit 150 with the image data for image forming is read by the output material reading unit 190 or the document reading unit 120, and read image data is generated. The read image data is stored in the image data storage unit 130 for subsequent processing (Step S1012 in FIG. 5).

In many cases, a precise match in the pixel unit cannot be obtained between the image data for image forming and the read image data due to contraction of the paper by fixing process in the fixing unit 160 when the image is formed by the image forming unit 150, an error of reading magnification by the output material reading unit 190 or the document reading unit 120, and the like. In such a case, when a comparison is made between the image data for image forming and read image data for color reproduction in the pixel unit, color difference due to positional difference is misrecognized instead of original color difference in an edge or a fine design part where color or strength sharply varies in the image.

Then, the specific area extracting unit 170 determines the specific area where the error is supposed to occur when the image data for image forming is compared with the read image data as the error factor area so that the specific area is excluded from the comparison. The specific area extracting unit 170 extracts an area with higher spatial frequency than other areas, that is, an area including an edge and an area including a fine pattern such as hatching, as the error factor area in at least one of the image data for image forming and the read image data. More specifically, the specific area extracting unit 170 determines the specific area where the error is supposed to easily occur due to characteristics of contents and the image, for example, the edge and its vicinity area and the area with higher spatial frequency than other areas and its vicinity area, as the error factor area, and determines the error factor area as the area to be excluded when the pixel values are compared. The error factor area information is stored in the image data storage unit 130 for subsequent processing (Step S1013 in FIG. 5).

The specific area extracting unit 170 applies differential process by Laplacian filter process on one of the image data for image forming and the read image data and further performs binarization process to identify an area to be an error factor such as edge, outline, and design part. In addition, various methods other than Laplacian filter process can be used as a method for identifying the area to be the error factor such as various types of space filter that provide similar effects and DoG (Difference of Gaussian) filter process.

Moreover, in consideration of the positional difference described above, it is also preferable that the obtained error factor area be expanded for a certain range by expansion process or the like or narrowed by contraction process on the error factor area side. However, if the error factor area is expanded more than necessary, an area to perform a color reproduction analysis described later will be reduced. Furthermore, although the error factor area can be expanded and narrowed by setting of the filter described above (such as filter type, filter coefficient strength, and binarization threshold value), it is preferable that the error factor area be accurately calculated and the area to perform the color reproduction analysis not be reduced. Then, it is also preferable that strength and the number of processing of expansion process and contraction process be selected and a filter shape, a coefficient, strength, a threshold parameter, and the like of filter process be set by operation via the operation and displaying unit 103. In addition, it is preferable to employ a method in which a determination coefficient (R2) with nearly 1.0 is determined in a regression analysis of the color tone analysis result when the error factor area is identified by several parameters and a parameter of filter process or expansion/contraction process is automatically selected.

After the image data for image forming, the read image data, and the error factor area information are obtained as described above, the color reproduction analyzing unit 180 performs the following processing for each pixel of the image data, excludes the error factor area, and stores the pixel value of the image data for forming image and the pixel value of the read image data.

More specifically, when the image data for image forming of a pixel of interest is a predetermined color (for example, primary color) (YES for Step S1015 in FIG. 5) and the read image data of the predetermined color is not included in the error factor area (YES for Step S1016 in FIG. 5), the color reproduction analyzing unit 180 identifies the pixel in the same position of the image data for image forming and the read image data for the pixel of interest (Step S1017 in FIG. 5), stores the pixel value of the image data for image forming for the identified pixel, and stores the pixel value of the read image data at the same pixel position corresponding to the image data for image forming (Step S1018 in FIG. 5). Then, the same processing is performed for all pixels of the image data for image forming and the read image data and the pixel values are stored (Steps S1014 to S1019 in FIG. 5).

It is preferable that the color reproduction analyzing unit 180 determine whether the image data for image forming of the pixel of interest is the predetermined color (Step S1015 in FIG. 5) as follows.

For example, when a predetermined color is a primary color (only Y, only M, only C, and only K), since there are no other color elements included, the color reproduction analysis described later is expected to be performed with high accuracy. However, if a condition to be the primary color is strictly interpreted, it is excluded from the color reproduction analysis even when little elements of other colors are added for making various adjustments in connection with a color profile. Actually, when addition of other colors is little, there are some cases where an adverse influence is not given to the color reproduction analysis. Then, the color reproduction analyzing unit 180 assumes that the condition of the primary color is satisfied even if other colors are added by less than the predetermined specific amount or by less than the specific amount set by the user via the operation and displaying unit 103.

Moreover, when the predetermined color described above is a secondary color (Y+M, Y+C, M+C), the color reproduction analysis described later is expected to be performed with relatively high accuracy since color elements of the third color are not included. However, if a condition to be a secondary color is strictly interpreted, it is excluded from the color reproduction analysis even when little elements of the third color are added for making various adjustments in connection with the color profile. Actually, when addition of other colors is little, there are some cases where an adverse influence is not given to the color reproduction analysis as the secondary color. Then, the color reproduction analyzing unit 180 assumes that the condition of secondary color is satisfied even if the third color is added by less than the predetermined specific amount or by less than the specific amount set by the user via the operation and displaying unit 103.

As described above, after pixels in an area other than the error factor area are extracted (Step S101 in FIG. 4), the color reproduction analyzing unit 180 refers to the read image data and characteristics of the image forming unit 150 and assumes that the image forming unit 150 is in an ideal state (color difference does not occur) to set the target value of the color of each pixel (Step S102 in FIG. 4).

The image data for image forming is YMCK data corresponding to a color of a color material such as YMCK and the read image data is RGB data obtained by optically reading YMCK of the color material on the paper by RGB. Then, it is preferable that the image data for image forming and the read image data be compared with each other after the format of the image data for image forming and the format of the read image data are made the same. For example, a method in which the image data for image forming and the read image data are compared with each other in RGB after the image data for image forming is converted to RGB format, a method in which the image data for image forming and the read image data are compared with each other after both of the image data for image forming and the read image data are converted to XYZ stimulus value in an XYZ color coordinate system, and a method in which the image data for image forming and the read image data are compared with each other after both of the image data for image forming and the read image data are converted to colorimetric value such as Lab color coordinate value in a Lab color coordinate system are possible. It is also possible to compare the image data for image forming and the read image data with each other after the format of the image data for image forming and the format of the read image data are made the same format other than those described specifically here.

Therefore, the color reproduction analyzing unit 180 refers to the image data for image forming and characteristics of the image forming unit 150 and sets the value such as RGB value, XYZ stimulus value, and Lab color coordinate value as the target value of the color of each pixel of the image data for image forming (Step S102 in FIG. 4).

Then, the color reproduction analyzing unit 180 compares the target value of the color of each pixel of the image data for image forming with the pixel value of the read image data at the same pixel position corresponding to that pixel to analyze color reproduction (Step S103 in FIG. 4).

When the color reproduction analyzing unit 180 compares the target value of the color of each pixel of the image data for image forming with the pixel value of the read image data at the same pixel position corresponding to that pixel, the comparison and the analysis are made after at least one of the image data for image forming and the read image data is converted so that the format of the image data for image forming and the format of the read image data are made the same such as RGB value, XYZ stimulus value, and Lab color coordinate value as described above.

In addition, when the comparison is made after the format of the image data for image forming and the format of all pixels of the read image data are made the same, it is preferable that the pixel values of a combination of the primary color of the read image data and a complementary color of that primary color be compared with the pixel value of the primary color (YMC) of the image data for image forming if the pixel of the primary color (YMCK) is searched for as the image data for image forming. For black K, it is preferable that the pixel values of a combination of black K and green G be compared for the pixel value of K of the image data for image forming rather than a relation of the complementary color.

It is possible to find the color difference element that appears on the complementary color element side and appropriately analyze the color reproduction by making the comparison of the following combinations, for example:

when image data for image forming=Y, read image data=Y+B, when image data for image forming=M, read image data=M+G, when image data for image forming=C, read image data=C+R, when image data for image forming=K, read image data=K+G.

In addition, when the comparison is made after the format of all pixels of the image data for image forming and the format of all pixels of the read image data are made the same, it is only required to compare the pixel values of a multi-color for the image data for image forming and the read image data if the pixel of a multi-color (such as secondary color and tertiary color) is searched for as the image data for image forming.

When the image data for image forming is a natural image rather than an illustration created by a computer, it is less possible that there is a number of pixels of a primary color. On the other hand, various colors exist in the natural image and it is more possible that a number of pixels of the secondary color exists more than the primary color. In such a case, it is preferable that pixels to be searched for be switched from the primary color to the secondary color.

In addition, as another example, the pixels of a read pure color (R, G, B) element may be searched for the image data for image forming and the pixel values of the image data for image forming and the read image data may be compared.

The color reproduction analysis result obtained by the comparison of corresponding pixels of the image data for image forming and the read image data described above can be used for various purposes such as display of the color reproduction analysis result on the operation and displaying unit 103, storing of the date and time of the color reproduction analysis and the color reproduction analysis result in the storage unit 104, transmission of the color reproduction analysis result to a management center or a management server (not illustrated), and adjustment of the image forming unit 150 with the color reproduction analysis result.

In the above embodiment, since the pixel values of the image data for image forming and the read image data are compared with each other after excluding the error factor area to analyze color reproduction, major errors do not occur in the result of the analysis of color reproduction by the comparison of pixel values of the image data for image forming and the read image data even if there is positional difference when pixel values of the image data for image forming and the read image data are compared. Accordingly, it is possible to accurately analyze color reproduction and control color variation without being influenced by an unstable factor. In addition, since it is not necessary to use the color patch or the like, productivity is not lowered.

[Operation of the Color Reproduction Analyzing Apparatus and the Image Forming Apparatus (2)]

Hereinafter, a second example of the operation of the color reproduction analyzing apparatus and the image forming apparatus according to the embodiment will be described with reference to the flow chart of FIG. 6.

Figure 6:
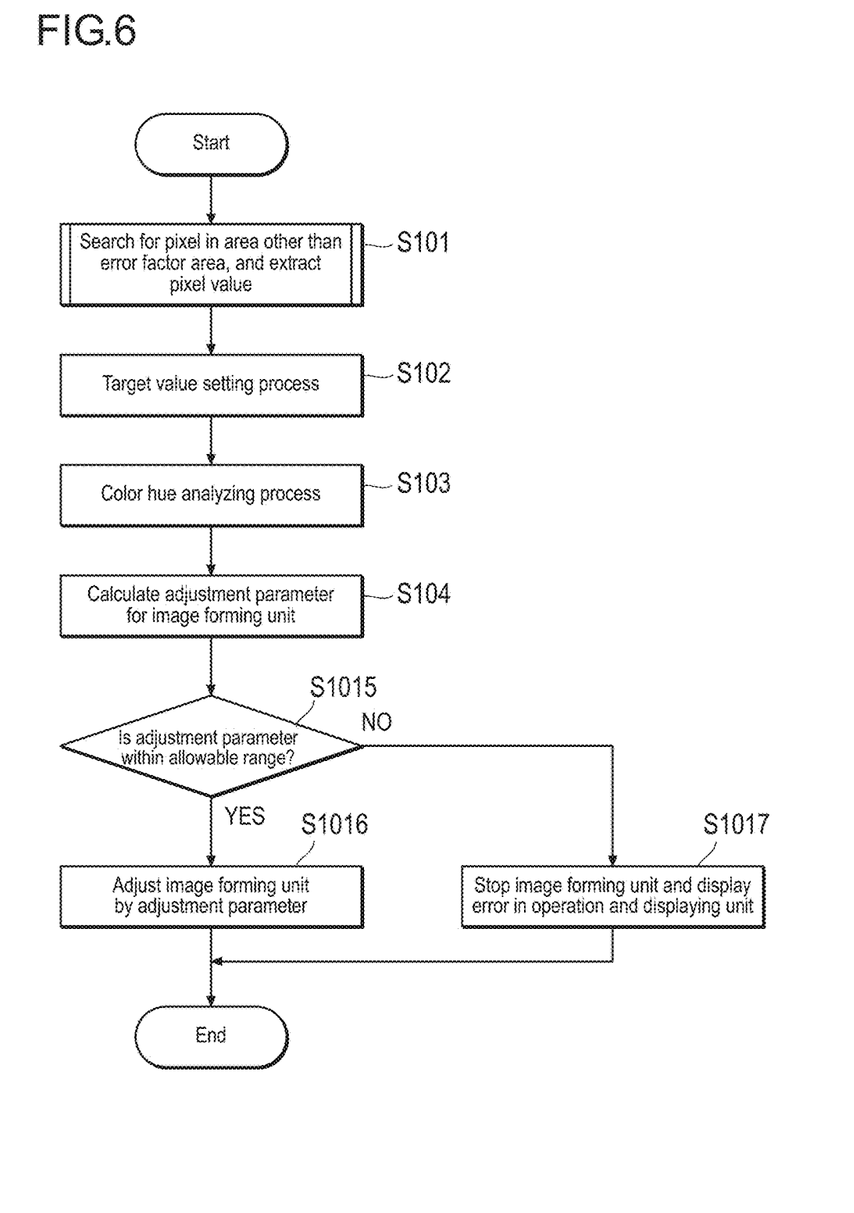
FIG. 6 is a flow chart illustrating an operation according to an embodiment of the present invention.

FIG. 6 is the flow chart illustrating an operation of a characterizing part of the present embodiment and the same step numbers are given to the same processes as those in the flow chart of FIG. 4 that have been already described. Therefore, repeated description will be omitted.

After the color reproduction analyzing unit 180 obtains the color reproduction analysis result by comparing corresponding pixels of the image data for image forming and the read image data as described above (Step S101 to S103 in FIG. 6), the control unit 101 generates the adjustment parameter for making the adjustment to enable the image forming unit 150 to form the image by the target color, by using the color reproduction analysis result (Step S104 in FIG. 6).

The control unit 101 determines whether the generated adjustment parameter is within a adjustment allowable range (Step S1015 in FIG. 6). If the generated adjustment parameter is within the adjustment allowable range (YES for Step S1015 in FIG. 6), the control unit 101 makes the adjustment with the adjustment parameter so that the image forming unit 150 can form the image by the target color (Step S1016 in FIG. 6).

On the other hand, if the generated adjustment parameter is out of the adjustment allowable range (NO for Step S1015 in FIG. 6), the control unit 101 stops the image forming operation of the image forming unit 150 and controls each unit so that occurrence of the error is displayed on the operation and displaying unit 103 (Step S1017 in FIG. 6).

According to the present embodiment, it is possible to continue keeping the image forming unit 150 as an appropriate state. In addition, since it is not necessary to use the color patch or the like, productivity is not lowered.

The adjustment allowable range means the adjustment parameter for adjusting color difference that may occur when the image forming unit 150 is in a normal state or the adjustment parameter in which the image forming unit 150 is considered to be an abnormal state, for example. It is also possible to set a different standard as a correction allowable range.

In addition, it is also possible to make the adjustment by the adjustment parameter, to display notice information together with making the adjustment by the adjustment parameter, and to display warning together with stopping the image forming operation in further more steps according to the adjustment range of the correction parameter.

[Operation of the Color Reproduction Analyzing Apparatus and the Image Forming Apparatus (3)]

The color reproduction analysis described above may be performed on each paper on which the image is formed or may be periodically performed at a predetermined timing.

Since it is not necessary to use the color patch or the like in the color reproduction analysis in the above embodiment, productivity is not lowered even if the color reproduction analysis is performed on each paper on which the image is formed.

Other Embodiments

Although the image forming apparatus 100 described in FIG. 1 includes the printer controller 110, it is not limited thereto. In other words, a configuration in which the printer controller is provided outside the image forming apparatus 100 and the image forming apparatus 100 receives RIP-treated image data for image forming from the outside is also possible.

The embodiments described above can provide the following effects.

(1) Since the specific area where the error is supposed to occur when comparing image data for image forming with read image data is extracted as the error factor area and the pixel values of the image data for image forming and the read image data are compared with each other to analyze color reproduction after excluding the error factor area, the major error does not occur in the result of the analysis of color reproduction by comparing the pixel values of the image data for image forming and the read image data even if there is positional difference when comparing the pixel values of the image data for image forming and the read image data. Accordingly, it is possible to accurately analyze the color reproduction to control color variation without being influenced by the unstable factor and without using the color patch or the like.

(2) In the above (1), since the area with higher spatial frequency than other areas is extracted as the error factor area in at least one of the image data for image forming and the read image data, the error factor is not included in the result of the analysis of the color reproduction by comparing the pixel values of the image data for image forming and the read image data even if there is positional difference when comparing the pixel values of the image data for image forming and the read image data.

(3) In the above (1) and (2), since the area including the edge is extracted as the error factor area in at least one of the image data for image forming and the read image data, the error factor is not included in the result of the analysis of the color reproduction by comparing the pixel values of the image data for image forming and the read image data even if there is positional difference when comparing the pixel values of the image data for image forming and the read image data.

(4) In the above (1) to (3), since the adjustment is made so that the area to be extracted as the error factor area is increased or decreased in accordance with the instruction or the adjustment, the error factor is not included in the result of the analysis of color reproduction while keeping a balance between excluding the error and securing data to be analyzed even if there is positional difference when comparing the pixel values of the image data for image forming and the read image data.

(5) In the above (1) to (4), since the desired color when obtaining the pixel value is the primary color in the color used by the image forming unit, it is possible to accurately calculate the result of the analysis of the color reproduction by comparing the pixel values of the image data for image forming and the read image data.

(6) In the above (1) to (5), since the pixels of the primary color in the color used by the image forming unit are searched for in the position corresponding to the image data for image forming and the read image data and the combination of the pixel values of the color of the complementary color of the primary color and the pixel values of the primary color is obtained in the pixels that are searched for, it is possible to accurately calculate the result of the analysis of the color reproduction by comparing the pixel values of the image data for image forming and the read image data.

(7) In the above (6), since it is considered as the primary color even if other colors than the primary color are included in the amount less than the constant amount, the error factor is not included in the result of the analysis of the color reproduction while keeping a balance between analysis accuracy and securing data to be analyzed.

(8) In the above (1) to (4), since the desired color when obtaining the pixel value is the multi-color of including at least secondary color or more in the color used by the image forming unit, the error factor is not included in the result of the analysis of the color reproduction while sufficiently securing the data to be analyzed.

(9) In the above (8), since the processing unit considers as the multi-color according to the color profile even if other colors than the multi-color are included in the amount less than the constant amount, the error factor is not included in the result of the analysis of the color reproduction while sufficiently securing the data to be analyzed.

(10) Since the image forming unit is corrected based on the color reproduction analysis result by the color reproduction analyzing apparatus of any one of the above (1) to (9), it is possible to form the image by the original target color.

What is claimed is:

1. A color reproduction analyzing apparatus comprising a hardware processor configured to:
   extract a specific area on which an error is supposed to occur as an error factor area when image data for forming an image on paper and read image data generated by reading the image on the paper are received and compared;
   obtain pixel values of a desired color in a position corresponding to said image data for image forming and said read image data, exclude said error factor area, and compare the pixel values of said image data for image forming and said read image data to analyze a color reproduction; and
   search for a pixel of a primary color in a color used by an image forming unit at the position corresponding to said image data for image forming and said read image data and obtain a combination of a pixel value of a color of a complementary color of said primary color and a pixel value of said primary color in said pixel that is searched for.

2. The color reproduction analyzing apparatus as claimed in claim 1, wherein
   said hardware processor is configured to extract an area with higher spatial frequency than other areas as said error factor area in at least one of said image data for image forming and said read image data.

3. The color reproduction analyzing apparatus as claimed in claim 1, wherein said hardware processor is configured to extract an area including an edge as said error factor area in at least one of said image data for image forming and said read image data.

4. The color reproduction analyzing apparatus as claimed in claim 1, wherein said hardware processor is configured to make an adjustment so that the area to be extracted as said error factor area is increased or decreased in accordance with an instruction or an adjustment.

5. The color reproduction analyzing apparatus as claimed in claim 1, wherein said hardware processor is configured to determine a primary color in a color used by said image forming unit as said desired color when obtaining said pixel value.

6. The color reproduction analyzing apparatus as claimed in claim 1, wherein said hardware processor is configured to consider as said primary color even if other colors than said primary color are included in an amount less than a constant amount.

7. The color reproduction analyzing apparatus as claimed in claim 1, wherein said hardware processor is configured to determine a multi-color of at least secondary color or more in a color used by said image forming unit as said desired color when obtaining said pixel value.

8. The color reproduction analyzing apparatus as claimed in claim 7, wherein hardware processor is configured to consider as said multi-color even if other colors than said multi-color are included in an amount less than a constant amount.

9. An image forming apparatus comprising:
said color reproduction analyzing apparatus as claimed in claim 1;
an image forming unit that forms an image on paper based on said image data for image forming;
a reading device that generates read image data by reading said image formed on said paper by said image forming unit;
a storage device that stores said image data for image forming and said read image data; and
a second hardware processor that refers to said color reproduction analyzed by said color reproduction analyzing apparatus, generates an adjustment parameter for making an adjustment so that said image forming unit forms an image by a target color, and adjusts said image forming unit so that the image is formed by the target color with said correction parameter.

10. The color reproduction analyzing apparatus according to claim 1, wherein said image is formed on the paper as a part of a print job instructed by a user, wherein said error factor area is a continuous portion of said image.

11. A color reproduction analyzing method in a color reproduction analyzing apparatus, comprising:
receiving image data for image forming for forming an image on paper and receiving read image data generated by reading said image formed on the paper by said image data for image forming;
extracting a specific area on which an error is supposed to occur as an error factor area when comparing said received image data for image forming with said received read image data;
obtaining pixel values of a desired color at a position corresponding to said image data for image forming and said read image data;
excluding said error factor area and comparing pixel values of said image data for image forming and said read image data to analyze a color reproduction;
searching for a pixel of a primary color in a color used by an image forming unit at the position corresponding to said image data for image forming and said read image data; and
obtaining a combination of a pixel value of a color of a complementary color of said primary color and a pixel value of said primary color in said pixel that is searched for.

12. The color reproduction analyzing method as claimed in claim 11, wherein in said extracting said specific area as said error factor area, an area with higher spatial frequency than other areas is extracted as said error factor area in at least one of said image data for image forming and said read image data.

13. The color reproduction analyzing method as claimed in claim 11 further comprising:
making an adjustment so that the area to be extracted as said error factor area is increased or decreased in accordance with an instruction or an adjustment.

14. The color reproduction analyzing method as claimed in claim 11, wherein
said color reproduction analyzing method is performed by an image forming apparatus comprising a color reproduction analyzing apparatus, an image forming unit that forms an image on paper based on image data for image forming, a reading device that generates read image data by reading said image formed on the paper by said image forming unit, and a storage device that stores said image data for image forming and said read image data.

15. A non-transitory computer readable storage medium stored with a program, said program causing a color reproduction analyzing apparatus to execute a process comprising:
receiving image data for image forming for forming an image on paper and receiving read image data generated by reading said image formed on the paper by said image data for image forming;
extracting a specific area on which an error is supposed to occur as an error factor area when comparing said received image data for image forming with said received read image data;
obtaining pixel values of a desired color in a position corresponding to said image data for image forming and said read image data;
excluding said error factor area and comparing pixel values of said image data for image forming and said read image data to analyze a color reproduction;
searching for a pixel of a primary color in a color used by an image forming unit at the position corresponding to said image data for image forming and said read image data; and
obtaining a combination of a pixel value of a color of a complementary color of said primary color and a pixel value of said primary color in said pixel that is searched for.

16. The non-transitory computer readable storage medium stored with the program as claimed in claim 15, wherein
in said extracting said specific area as said error factor area, an area with higher spatial frequency than other areas is extracted as said error factor area in at least one of said image data for image forming and said read image data.

17. The non-transitory computer readable storage medium stored with the program as claimed in claim 15, said process further comprising:
making an adjustment so that an area to be extracted as said error factor area is increased or decreased in accordance with an instruction or an adjustment.

18. The non-transitory computer readable storage medium stored with the program as claimed in claim 15, wherein
said process is executed by an image forming apparatus comprising a color reproduction analyzing apparatus, an image forming unit that forms an image on paper based on image data for image forming, a reading device that generates read image data by reading said image formed on the paper by said image forming unit, and a storage device that stores said image data for image forming and said read image data.

19. The color reproduction analyzing method as claimed in claim 11, wherein said image is formed on the paper as a part of a print job instructed by a user, wherein said error factor area is a continuous portion of said image.

20. The non-transitory computer readable storage medium stored with the program as claimed in claim 15, wherein said image is formed on the paper as a part of a print job instructed by a user, wherein said error factor area is a continuous portion of said image.

* * * * *